United States Patent [19]

Henze

[11] Patent Number: 4,758,390
[45] Date of Patent: Jul. 19, 1988

[54] PROCESS OF MANUFACTURING ROLLS OF EXTRUDED CONTINUOUS FILM

[75] Inventor: Rainer Henze, Lengerich, Fed. Rep. of Germany

[73] Assignee: Windmoller & Holscher, Lengerich, Fed. Rep. of Germany

[21] Appl. No.: 95,699

[22] Filed: Sep. 14, 1987

[30] Foreign Application Priority Data

Sep. 16, 1986 [DE] Fed. Rep. of Germany ....... 3631503

[51] Int. Cl.$^4$ ............................................. B29C 47/92
[52] U.S. Cl. .................. 264/40.1; 264/40.2; 264/40.6; 425/141; 425/144
[58] Field of Search ............... 156/64, 244.11, 244.25, 156/378; 73/159; 264/40.1, 40.2, 40.6, 40.7, 167, 210.5, 514, 515, 519, 569; 425/140, 141, 143, 144, 326.1, 379 R, 381

[56] References Cited

U.S. PATENT DOCUMENTS

| 4,000,402 | 12/1976 | Higham ............................ 425/141 |
| 4,276,324 | 6/1981 | Pöhler et al. ..................... 365/51 |
| 4,351,785 | 9/1982 | Upmeier et al. .................. 425/141 |
| 4,425,290 | 1/1984 | Upmeier ........................... 425/141 |
| 4,426,239 | 1/1984 | Upmeier ........................... 425/141 |

FOREIGN PATENT DOCUMENTS 2035584  3/1972  Fed. Rep. of Germany .
2947293  5/1981  Fed. Rep. of Germany .

Primary Examiner—Jan H. Silbaugh
Assistant Examiner—Jill L. Fortenberry
Attorney, Agent, or Firm—Fleit, Jacobson, Cohn & Price

[57] ABSTRACT

A process of manufacturing a roll of continuous synthetic thermoplastic film consisting of extruded flat film or of extruded blow-formed and flattened tubular film in which the thickness of the film is measured over the width of the film. Any striplike portion which deviates in thickness from a means thickness of the film is adjusted. The temperatures of juxtaposed temperature control sectors or the width of those portions of the slot die or of the annular die from which said striplike portions have been extruded are adjustable. When a striplike longitudinal portion having a relatively large thickness is detected in the film, the film is subsequently extruded to have a corresponding portion which has a relatively small thickness within specified thickness limits and for a length such that the two portions as superimposed in the roll have an average thickness approximately equal to the mean film thickness.

5 Claims, 2 Drawing Sheets

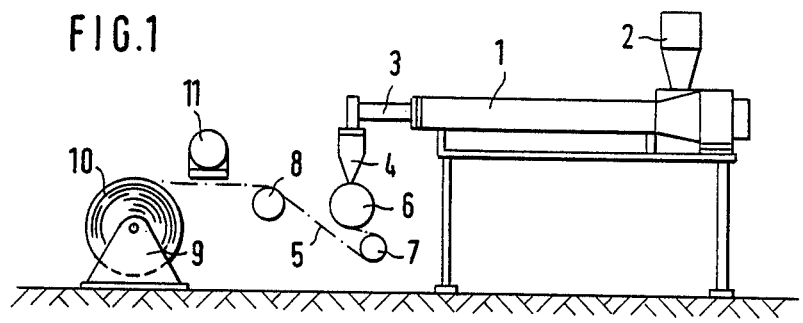
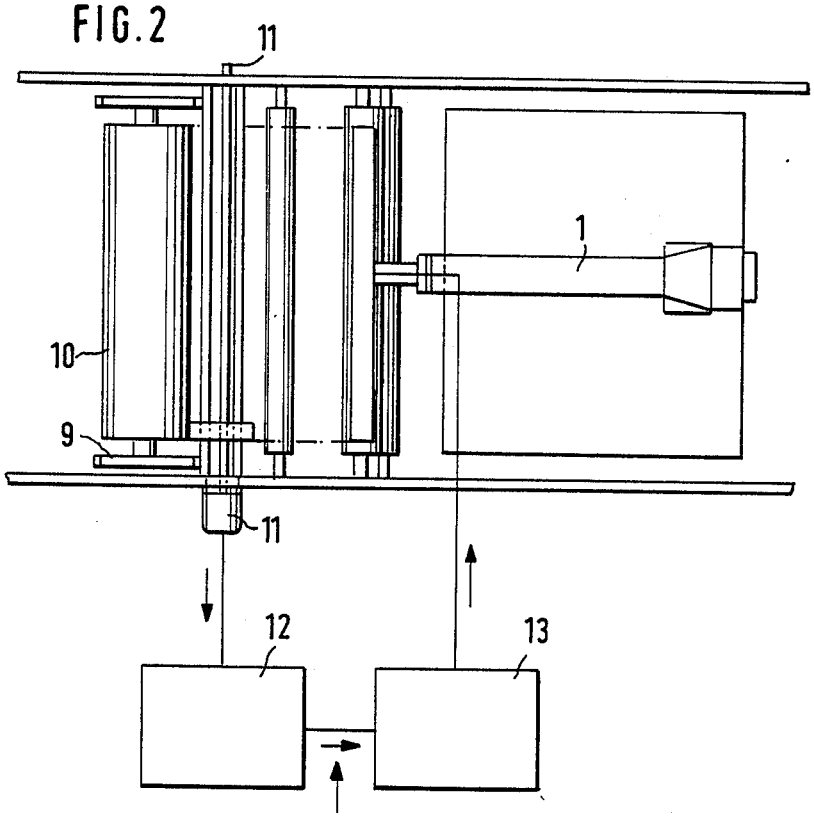

PROCESS OF MANUFACTURING ROLLS OF EXTRUDED CONTINUOUS FILM

BACKGROUND OF THE INVENTION

1. Field of the Invention

This invention relates to a process of manufacturing rolls of continuous synthetic thermoplastic film consisting of extruded flat film or of extruded, blow-formed and flattened tubular film wherein the thickness of the film is measured over the width of the film and any longitudinal striplike portions which deviate in thickness from a given thickness of the film are adjusted to restore the deviant striplike portion to said mean thickness by adjusting the temperatures of juxtaposed temperature control sectors of the die slot corresponding to the striplike portions of the film or by changing or varying the width or opening of corresponding portions or segments of the extrusion slot or mouth of the extruding die.

2. Description of the Prior Art

In the manufacture of extruded, blow-formed and flattened tubular films and of extruded flat films, it is not possible to avoid a deviation of the thickness of the continuous film from the mean thickness of the film over the width of the film. When such films are wound up to form rolls of film, the resulting rolls will be formed with annular bulges as a result of the superposition of relatively thick and/or relatively thin portions. Rolls of film having such annular bulges have an unpleasing appearance and owing to the bulges the continuous film when unwound from the roll will not lie perfectly flat on a support so that difficulties may arise during the subsequent processing.

German patent specification No. 20 35 584 discloses an apparatus and a process for making cylindrical rolls from extruded, blow-formed and flattened tubular film. In that apparatus and process, inflated blown tubular film is flattened by means of flattening plates, which are reversingly moved through 360° so that any relatively thick and relatively thin portions of the tubular film will be distributed in the manner in which a rope is wound when the flattened tubular film is being wound to form a roll.

In the process known from German patent specification No. 20 35 584, relatively thick and/or relatively thin portions of the film are merely distributed over the width of the roll of film so that cylindrical rolls are obtained. But such relatively thick and/or relatively thin portions of the film are not eliminated. On the other hand, processes are known, e.g., from Published German application No. 29 47 293 and U.S. Pat. No. 4,426,239, which disclose how relatively thick and relatively thin longitudinal portions of the continuous films are eliminated by a particular automatic control with reference to the mean thickness of the film in order to achieve rolls which are formed as perfectly cylindrical as possible. However, practice of these processes can still result in the flat film or flattened tubular film comprising a longitudinally extending strip-shaped portion which is relatively thick and, therefore, such excessive thickness can build up during the superposition of the wound convolutions to form an annular bulge in the roll. Even though a relatively thick portion may be eliminated by an automatic control with reference to the mean thickness of the film, any previously formed annular bulge will still deform the convolutions of subsequently wound film adjusted to the mean film thickness and, hence, those convolutions will thus be formed with bulges, which when the film is unwound will be preserved as cambered portions, giving rise to difficulties in the processing of the film.

SUMMARY OF THE INVENTION

For these reasons, a principal object of the invention is to provide a process, of the kind described, which enables film, from which relatively thick and relatively thin portions have been eliminated by an automatic control with reference to a mean film thickness, to be wound up to form smooth even cylindrical rolls even though a plurality of convolutions having relatively thick and/or relatively thin portions may have been wound on each other and have resulted in a formation of temporary bulges in the roll of film as it is being formed.

In a process of the kind described, that object is accomplished by detecting in the film the formation of a striplike longitudinal portion having a relatively large thickness, that is, a thickness greater than a preselected deviation of thickness from a preselected mean thickness for the film. Responsive to detecting a striplike longitudinal portion of a relatively large thickness, the film is extruded to have a corresponding portion of relatively small thickness, that is, a thickness less than the preselected mean thickness, within certain preselected specified thickness limits and for a length of subsequently extruded portion such that the two portions when superimposed in the roll will have an average thickness which is approximately the same as the mean film thickness.

In the process in accordance with the invention, the detection of a relatively thick portion leads directly to the extrusion of a relatively thin compensating portion so that after winding of one or more convolutions of the film the relatively thick portion will be compensated by the superimposed relatively thin portion and a smooth even cylindrical roll will result. When the process in accordance with the invention has been carried out to eliminate an annular bulge by the winding of relatively thin portions extruded in a controlled manner, the corresponding striplike portions will be adjusted in thickness by automatic control with reference to the mean thickness of the film so that the process is carried out in a way to form continuous tubular films which have throughout their width a thickness that is substantially equal to the mean film thickness. In response to relatively thick portions which will form annular bulges in the wound roll, relatively thin portions can be extruded in a controlled manner as long as their thickness is within preselected specified thickness limits.

In a preferred embodiment, the length of the relatively thin portion used for correction exceeds the length of the relatively thick portion to be compensated. As a result, the relatively thin compensating portion may be closer to (less deviant from) the mean film thickness and need not be equal to the specified thickness limits, that is, may not deviate as much as does the thick portion.

The process in accordance with the present invention can be performed in a desirable manner, such as, by visual observation and by hand or can employ known instrumentation for detecting striplike portions of greater thickness and a known extrusion die arranged to change the temperature of or varying the opening of portions or segments corresponding to the notional striplike portions being monitored across the width of the film. Upon detection of a thicker portion, the extent of deviation from the mean thickness is determined as well as the duration (length) of the deviation. This information forms the basis of the correction and results in the extrusion die being controlled to produce a correlated negative or opposite sense deviation for a predetermined time sufficient to average out the two corresponding striplike portions to the mean thickness. Any known control system which can function according to the given parameters can be used. Optionally, the extrusion die may be controlled by a microcomputer which receives suitably encoded signals indicative of the deviation from mean thickness sensed by the thickness detector and the duration of the deviation and which calculates a thickness of a relatively thin portion to be formed as a response to the detection of the relatively thick portion which will form a bulge in the wound roll and to instruct the extrusion die to change its temperature or adjust its opening for the corresponding portion or segment to produce the calculated thin portion for a calculated time to average out the thick portion.

If the film roll being formed has annular depressions resulting from relatively thin film portions which are superimposed, such relatively thin portions may be compensated by complementary portions which are relatively thick simply by working the invention in the reverse way.

BRIEF DESCRIPTION OF THE DRAWINGS

FIG. 1 is a diagrammatic side elevation showing a plant for extruding flat film and a succeeding winder.

FIG. 2 is a top plan view showing the plant of FIG. 1.

DETAILED DESCRIPTION OF A PREFERRED EMBODIMENT

Figure 3:
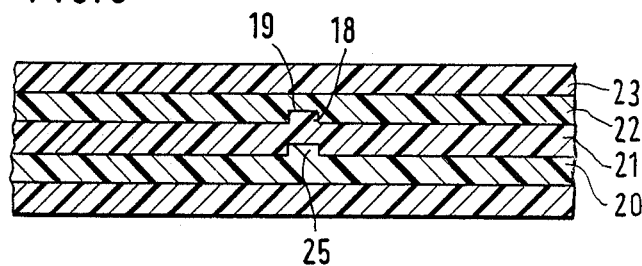
FIGS. 3 and 4 are sectional views showing a plurality of convolutions of the wound roll with relatively thick portions and relatively thin compensating portions.

In a preferred embodiment of the invention, plastic granules are fed to hopper 2 and melted in extruder 1 and by the latter are fed through line 3 to slot die 4. Flat film 5 emerging from the slot die 4 is still soft and moves into contact with the periphery of cooling cylinder 6. The flat film 5 is guided by guide rollers 7, 8 to winder 9, in which the film is wound to form a roll of film 10. When a roll having the desired diameter has been wound, the flat film 5 is severed and the winding of a new roll is initiated. The invention is equally applicable to blown film methods that use annular dies.

The thickness profile of the continuous flat film 5 which has been extruded is continuously measured across the width of film 5 by a known thickness sensor 11, which is continually reciprocated over the width of the extruded continuous film which has been extruded. The film 5 is notionally divided in a series of contiguous longitudinal striplike portions and the sensor 11 measures or detects the thickness of each longitudinal striplike portion during each reciprocation.

The signals from the sensor 11 are delivered to a known thickness-measuring system 12 which takes the output from the sensor 11 and develops signals indicative of the amount of deviation from a given mean film thickness and the duration of deviation. These signals, in suitable form, are fed to a profile control system 13. Any conventional mechanism or means may be used for controlling the temperature of slot die 4 responsive to signals indicative of which one of the striplike portions is deviating, how much and how long. For example, these functions may readily be carried out by a conventional microprocessor suitably programmed as noted in the foregoing. The slot die 4 is divided into temperature control sectors or segments corresponding in width and position to the striplike portions being monitored, which receive correcting signals from the profile controller 13. Except for certain modifications, the plant for extruding flat film shown in FIGS. 1 and 2 and the associated control system is of the kind described in U.S. Pat. No. 4,426,239, the disclosure of which is incorporated herein by reference.

Figure 4:
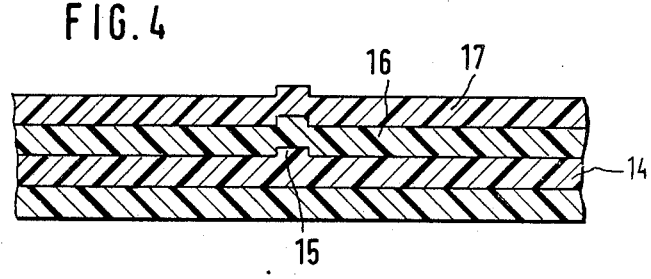

From the diagrammatic representation in FIG. 4, it is apparent that a relatively thick portion 15 in convolution 14 which extends peripherally around the roll as the film is being wound will deform superimposed convolutions 16, 17 even when they are extruded with mean thickness and have no relatively thick portions. Convolutions 16 and 17 have already been adjusted to the mean film thickness by automatic control.

To avoid the winding of a roll which has annular bulges, any relatively thick portions 25 in convolution 20 or deformed bulging portions 18 in convolution 21 will be compensated by relatively thin portions 19 in convolution 22 having a controlled thickness in the manner shown in FIG. 3. When the thin portion 19 averages out the thick portion 25, the subsequent convolutions of film will be even, see convolution 23.

If used, the computer incorporated in the profile control system 13 will determine the extent of deviation from mean thickness, length and the position of the relatively thick or relatively thin portions which have been detected and thus instruct a controlled compensation of relatively thick and/or relatively thin portions in the roll being wound by an extrusion of relatively thin or relatively thick portions having a preselected controlled thickness.

What is claimed is:

1. In a process of manufacturing a roll of continuous synthetic thermoplastic film consisting of extruded flat film or of extruded, blow-formed and flattened tubular film wherein the thickness of the film is measured over the width of the film and any striplike portions which deviate in thickness from a given mean thickness of the film are adjusted to said mean thickness in that the temperatures of juxtaposed temperature control sectors are changed or the width of those portions of the slot die or of the annular die from which said striplike portions have been extruded are changed, and the film is wound up to form a roll, the improvement comprising detecting a striplike longitudinal portion having a thickness deviating from said given mean thickness being detected in the film, extruding the film, responsive to said striplike longitudinal portion, to have a corresponding portion of thickness deviating in the opposite sense from said given mean thickness within preselected thickness limits and for a preselected length such that said striplike longitudinal portion and said corresponding portion are superimposed in said roll when said film is wound up to form said roll and have an average thickness approximately equal to the given mean film thickness.

2. A process according to claim 1, wherein the length of the corresponding portion exceeds the length of the striplike longitudinal portion.

3. A process according to claim 1, wherein said striplike longitudinal portion is thicker than the given mean thickness.

4. A process according to claim 1, wherein said striplike longitudinal portion is thinner than the given mean thickness.

5. A process according to claim 3, wherein the corresponding portion deviates less from the given mean thickness than the striplike longitudinal portion deviates and is of a length greater than the length of the striplike longitudinal portion.

* * * * *